United States Patent Office 3,770,644
Patented Nov. 6, 1973

3,770,644
SODIUM TRIPOLYPHOSPHATE
Wilhelm Huttinger, Engenhahn, Taunus, Heinz von Almasy, Wiesbaden-Biebrich, and Joachim Buchwald, Wiesbaden, Germany (all % Chemische Werke Albert, Wiesbaden-Biebrich, Germany)
No Drawing. Filed Feb. 16, 1971, Ser. No. 115,768
Claims priority, application Germany, Feb. 17, 1970, P 20 07 044.4; Jan. 16, 1971, P 21 01 951.2
Int. Cl. C01b 25/38; C11d 3/06
U.S. Cl. 252—135                                  7 Claims

ABSTRACT OF THE DISCLOSURE

A process of increasing the hardness of sodium tripolyphosphate hollow spheres which comprises spray-drying a solution of mono- and disodium phosphate which has been adjusted to a ratio of Na:P of approximately 5:3 to yield a spray product which contains more than 10% by weight condensed phosphate, calcining the spray product and treating the calcinate at a temperature of less than 80° C. with sufficient moisture to yield a product having an ash loss of 0.2 to 7% by weight and a detergent composition containing this sodium tripolyphosphate hollow spheres as an essential ingredient.

---

The present invention is concerned with a method of increasing the hardness of sodium tripolyphosphate in the form of hollow spheres which are prepared by the two stage process of spraying a solution of mono- and disodium phosphate under conditions under which the water is evaporated, followed by subsequent calcination.

It is known to prepare sodium tripolyphosphate in hollow spherical form by spraying and subsequent calcination in the tubular furnace. Care must then be taken that the hollow spheres formed are preserved during the further course of the process and are not destroyed. It is possible to achieve this by taking a number of precautions, especially in the conveyor unit.

The preparation of the hollow spheres takes place during the drying of the solution of a mixture of mono- and disodium phosphate with a content of approximately 34% monosodium phosphate in the spraying tower. The product dried in the spraying tower is converted in the subsequent rotary tube into sodium tripolyphosphate, the extent of phase 1 and phase 2 being controlled by the temperature employed.

The hollow spheres obtained in this way are easily fractured.

In more recent methods for the preparation of detergents, these hollow spheres are sprayed with detergent substances and/or enzyme solutions or the like in the spray mist mixer or other rotating devices. During the rotation of these apparatus, destruction of the hollow spheres then occurs. This is undesirable because as a result the bulk density is increased and undesirable amount of dust in the finished product is formed.

It has also been suggested to produce granulated sodium tripolyphosphate by heating a sodium orthophosphate mixture to a temperature in excess of 350° C. In order to obtain large crystals, crystalline sodium tripolyphosphate may be added to the product to be granulated. The purpose of this addition is that the physical decomposition of the granulate, which will otherwise occur, is prevented. The crystalline structure of this granulate can be further improved if to the product to be granulated a mono- or bivalent cation such as K, Rb, Cs, Cu, Ag, AU, Ga, In, Tl, and Be, Mg, Ca, Ti, Cr, Mn, Fe, Co, Ni, Zn, Rh, Pd, Cd, or Pt, combined with anions, such as fluoride, sulfate, silicate or borate is added. The amount of this addition should be around 10 mol percent of the sodium tripolyphosphate.

It has also been suggested to mix mono- and disodium phosphate with crystallisation inhibiting salts such as calcium bromide or magnesium sulfate in the dry state, pressing the mixture and then calcining. In this way, highly compact granulates are obtained.

Finally, it has also been proposed to add water to a predried mixture from mono- and disodium phosphate to calcining in order to obtain, after calcining, the maximum yield of tripolyphosphate.

By means of the present invention it is possible to produce sodium tripolyphosphate in such a hollow spherical form that it will withstand strong mechanical stresses.

According to the present invention there is provided a method of increasing the hardness of sodium tripolyphosphate hollow spheres which have been obtained by spray drying of a suitably adjusted, as herein defined, orthophosphate solution and subsequent calcination wherein said solution is converted into a spray product which contains more than 10% by weight condensed phosphate, the latter is calcined and the calcinate is treated at a temperature of less than 80% with sufficient moisture to yield a product having an ash loss of 0.2 to 7% by weight.

By the expression "suitably adjusted" orthophosphate solution is to be understood a solution of mono- and disodium phosphate which has been adjusted to a ratio of Na:P of approximately 5:3. The spraying is effected by the counter-current principle. Preferably, the spray product contains more than 10% by weight of sodium tripolyphosphate and not more than 40% by weight of condensed phosphate.

The amount of condensed phosphate or tripolyphosphate in the dry product produced by the spray tower can be varied in various ways, for example by controlling the temperature and by influencing the dwelling time of the material in the spraying tower through extending the suspension time of the anhydrous hollow bodies. The temperature is generally within the range 300 to 500° C. An addition of condensed phosphate or of sodium tripolyphosphate in solid or dissolved form to the solution to be sprayed, for example by returning the scrubbing waters of the plants, or a combination with control of the temperature is also possible.

After treatment of the calcined sodium tripolyphosphate with moisture, which is preferably carried out at a temperature of 10–60° C., a considerable increase in hardness is effected. The moisture can be added in the form of a mist or in the form of water-enriched or water-saturated air.

If the solution to be sprayed contains no alkaline earth sulfate, or only a small amount, a further addition of hardeners is of advantage to increase the hardness. In accordance with the invention, soluble alkaline earth sulfate such as magnesium and calcium sulfate are suitable. The amount of these sulfates, calculated as $SO_3$, is at least 0.04% by weight, generally between 0.04 and 0.6% by weight, but preferably 0.06 to 0.4% by weight, calculated on the sodium tripolyphosphate finally produced. If the phosphate solution is sprayed in combustion gases containing small amounts of $SO_3$, this can be absorbed by the sodium tripolyphosphate. As a result, the $SO_3$ content in the finished sodium tripolyphosphate can, for example increase by 0.15 to 0.2% by weight. This $SO_3$ is then present in the form of sodium sulfate. The values for the additions in accordance with the invention must not therefore be confused with those $SO_3$ values that are found in commercial products.

A considerable increase in hardness is moreover effected if a solution is sprayed that contains other soluble hardeners, namely boric acid and/or inorganic boric acid compounds. If the solution to be sprayed is free of any content of alkaline earth sulfate, the amount of boric acid compounds (calculated as boron), should be at least 0.004% by weight, preferably 0.005 to 0.04% by weight, calculated on the sodium tripolyphosphate produced. A suitable boron compound is for example, borax.

If the solution to be sprayed contains both soluble alkaline earth sulfates and boric acid or boric acid compounds, the amount of the alkaline earth sulfates and of the borates can be reduced of course below the minimum values named. Decisive in this case is the fact that both substances together are present in such amounts that an adequate effect is achieved, namely at least an effect equivalent to that produced with the minimum amount of boric acid or boric acid compound on the one hand or alkaline earth sulfate on the other.

The process in accordance with the invention is suitable for the processing of phosphate solutions produced from wet phosphoric acid, especially if these contain adequate amounts of alkaline earth sulfate. When using thermal phosphoric acid, an addition in the form of soluble hardening agents is desirable in order to achieve optimum results. These can also be used successfully if wet phosphoric acid is employed.

The measures in accordance with the invention ensure that hollow spheres with a particularly outstanding abrasion resistance and hardness are obtained. Beyond the hardener content specified and without the addition of moisture, no corresponding increase in abrasion resistance is achieved. Through the treatment with moisture (especially at the specified material temperature) water absorption of the polyphosphate takes place which in turn results, in conjunction with the hardener addition, in a particularly high increase in the strength of the hollow spheres, which is also reflected in an increasing ash loss. If the value for water absorption in the presence of an adequate amount of hardener is so great that the ash loss is as much as 7%, the hardness will for all practical purposes increase no further: on the contrary, it will decrease.

The ash loss is determined according to ISO Standard 1114 by heating approximately 5 g. of sodium tripolyphosphate in a quartz dish at 500° C. until the weight is constant.

The hardness of the tripolyphosphate hollow spheres is established as follows: 100 g. of the sodium tripolyphosphate finished product in the form of hollow spheres, are weighted. These are then placed on the screen of a laboratory screen with a diameter of 20 cm. and a height of approximately 15 cm. The sample is vibrated on a horizontal screening machine with 10 steel balls having a diameter of 2 cm. each and a total weight of 35.8 g. The material treated in this way is then subjected to fractional screening into a portion of 150 to 1,000μ magnitude and an amount of less than 150μ magnitude. The screening fraction of 150 to 1,000μ then represents the satisfactory, not significantly crushed product (subsequently described as the "good product") and is a measure of the hardness of the hollow spheres.

The sodium tripolyphosphate hollow spheres thus obtained are with advantage used as an essential ingredient in detergents.

In order that the invention may be more understood the following examples are given by way of illustration only. In the examples it is to be understood that the calcined spray dried product is in the form of hollow spheres. Good product portion and ash losses are expressed in percent by weight; bulk product values are expressed in g./l.

EXAMPLE 1

If sodium tripolyphosphate (obtained from wet phosphoric acid in such a manner that during the spray process an amount of approximately 30% of condensed phosphate was formed and which was subsequently calcined in a conventional manner, the initial solution having approximately 0.6% by weight $SO_3$ as alkali metal and alkaline earth metal sulfide and the end product having an ash loss of 0.03% by weight and a good product proportion of approximately 48%) is allowed to stand in a closed vessel over water at room temperature in an atmosphere saturated with moisture, then, always measured on a new sample, the following values for the good product are obtained after the time interval in hours stated:

| Hours | 1 | 2 | 3 | 4 |
|---|---|---|---|---|
| Good product | 56 | 56.6 | 64 | 83 |
| Ash loss | 1.25 | 1.60 | 2.18 | 2.40 |

The results show that the hardening of the sodium tripolyphosphate is dependent upon water from the moist atmosphere.

EXAMPLE 2

If starting materials in accordance with Example 1 (with a bulk density of 530 to 560 g./l., an ash loss of 0.08% by weight and a good product proportion of approximately 45 to 51.2% by weight) are treated continuously on a fluidised bed with moist air of 100% relative humidity and a temperature of 35° C., then products with a bulk density of 523 to 566 g./l. are obtained which have the following values for the ash losses or good product portions:

| Ash loss: | Good product portion |
|---|---|
| 0.22 | 60.8 |
| 0.20 | 60.2 |
| 0.52 | 69.4 |
| 0.57 | 71.6 |
| 0.58 | 75.4 |
| 0.62 | 78.0 |
| 0.79 | 83.2 |

EXAMPLE 3

A solution of mono- and disodium orthophosphate from thermal phosphoric acid and caustic soda was sprayed in such a manner that the spray dried product contained an amount of 30 to 40% of condensed phosphate. This was subsequently calcined conventionally and treated as indicated:

| Treatment | Good product portion | Bulk density | Ash loss |
|---|---|---|---|
| Not humidified | 47.3 | 572 | 0.2 |
| Humidified (analogous to Ex. 2) | 64.0 | 563 | 4 |
| Humidified 1 hour (analogous to Ex. 1) | 62 | 572 | 1.02 |

Result: The humidified product has a hardness that is higher than that of the unhumidified product.

EXAMPLE 4

A solution of mono- and disodium orthophosphate from thermal phosphoric acid and caustic soda was sprayed, and during neutralisation 13% of solid sodium tripolyphosphate (calculated on the amount of sodium tripolyphosphate produced after calcination) had been added. The product obtained during the spray drying process again contained 30 to 40% condensed phosphate. It was subsequently calcined conventionally and treated as indicated:

| Treatment | Good product portion | Bulk density | Ash loss |
|---|---|---|---|
| Not humidified | 61.9 | 583 | 0.06 |
| Humidified, (analogous to Ex. 2) | 79.4 | 583 | 1.97 |
| Humidified, 1 hour (analogous Ex. 1) | 78.8 | 583 | 1.45 |

Result: As the result of the resolution of tripolyphosphate in the solution that was sprayed, the strength increases both in the non-humidified as well as in the humidified product. It increases further after humidification and the final value of the good product is higher than that of Example 3.

EXAMPLE 5

Sodium tripolyphosphate was investigated which, in the manner stated in Example 4, had been prepared with an addition of 13% of solid sodium tripolyphosphate and, additionally, 0.1% gypsum demi-hydrate and 0.15% MgSO$_4$·7H$_2$O (total of 0.104% SO$_3$), calculated on the sodium tripolyphosphate finally produced, from thermal phosphoric acid and caustic soda solution by the spray process. The spray dried product contained approximately 30 to 40% condensed phosphate.

| Treatment | Good product portion | Bulk density | Ash loss |
|---|---|---|---|
| Not humidified | 66.7 | 610 | 0.11 |
| Humidified, (analogous to Ex. 2) | 88.3 | 613 | 2.18 |
| Humidified, 1 hour (analogous to Ex. 1) | 87.7 | 610 | 1.29 |

Result: The addition of low amounts of alkaline earth sulfate increases the strength values once more in comparison with Example 4.

EXAMPLE 6

(A) Sodium tripolyphosphate was investigated that had been prepared in the manner described in Example 4 by the spray process from thermal phosphoric acid and caustic soda solution with an addition of 13% solid sodium tripolyphosphate and with the supplementary addition of 0.15% borax (=0.017% boron), calculated on the sodium tripolyphosphate finally produced. The spray dried product again contained 30 to 40% condensed phosphate.

| Treatment | Good product portion | Bulk density | Ash loss |
|---|---|---|---|
| Not humidified | 69.9 | 580 | 0.05 |
| Humidified, (analogous to Ex. 2) | 85.8 | 553 | 1.20 |
| Humidified, (analogous to Ex. 1): | | | |
| 1 hour | 80.0 | 580 | 1.14 |
| 4 hours | 87 | 580 | 2.8 |

(B) If the borax addition is reduced to 0.08% (=0.009% boron), the following values are obtained:

| Treatment | Good product portion | Bulk density | Ash loss |
|---|---|---|---|
| Not humidified | 71.2 | 579 | 0.1 |
| Humidified, (analgous to Ex. 2) | 84.3 | 578 | 0.8 |
| Humidified, 1 hour (analogous to Ex. 1) | 86 | 579 | 1.5 |

Result: By the addition of small amounts of borax to the solution to be sprayed, improved strength compared with the product from Example 5, is achieved.

EXAMPLE 7

If to the initial batch of Example 5, in which however the spray process was controlled so as to give a different bulk density, 0.033% boric acid (=0.006% boron) are added, the following values are obtained:

| Treatment | Good product portion | Bulk density | Ash loss |
|---|---|---|---|
| Initial solution without boric acid addition | 64 | 550–570 | 0.002 |
| After boric acid addition and humidification (analogous to Ex. 2) | 79 | 550–570 | 1.2 |

Result: The addition of boric acid also increases the strength.

EXAMPLE 8

A sodium tripolyphosphate was investigated which had been prepared in the manner described in Example 4 by the spray process from thermal phosphoric acid and caustic soda solution with an addition of 13% solid sodium tripolyphosphate and with a supplementary addition of 0.008% gypsum-demihydrate and 0.12% MgSO$_4$·7H$_2$O (in total =0.083% SO$_3$) and 0.08% borax (=0.009% boron), calculated on the finished product. The spray dried product again contained 30 to 40% condensed phosphate.

| Treatment | Good product portion | Bulk density | Ash loss |
|---|---|---|---|
| Not humidified | 73 | 584 | 0.04 |
| Humidified: | | | |
| Sample a | 82 | 564 | 0.9 |
| Sample b | 86.3 | 602 | 1.75 |
| Humidified, 1 hour (analogous to Ex. 1) | 82.1 | 538 | 1.3 |

The initial hardness of this product, without moisture treatment, is higher than that of a product according to Example 5 and 6(A) not treated with moisture. After moisture treatment, the hardness is just as high as after moisture treatment of the product in accordance with Examples 5 and 6(A).

EXAMPLE 9

A sodium tripolyphosphate was investigated that had been prepared by the spray process from thermal phosphoric acid and caustic soda and an addition of 0.134% of borax (=0.015% boron), calculated on the sodium tripolyphosphate finally produced. The spray dried product again contained 30 to 40% condensed phosphate.

| Treatment | Good product portion | Bulk density | Ash loss |
|---|---|---|---|
| Not humidified | 65.7 | 600 | 0.13 |
| Humidified (analogous to Ex. 2) | 83.3 | 590 | 1.67 |
| Humidified, 1 hour (analogous to Ex. 1) | 79.8 | 600 | 1.35 |

Result: Even without dissolution of solid sodium tripolyphosphate, the values of Example 4 are achieved through the addition of borax.

EXAMPLE 10

Sodium tripolyphosphate was investigated that had been prepared by the spray process from thermal phosphoric acid and caustic soda solution with the addition of 0.1% gypsum demihydrate and 0.13% MgSO$_4$·7H$_2$O (in total =0.097% SO$_3$), calculated on the sodium tripolyphosphate finally produced. The spray dried product again contained 30 to 40% condensed phosphate.

| Treatment | Good product proportion | Bulk density | Ash loss |
|---|---|---|---|
| Not humidified | 57.2 | 582 | 0.05 |
| Humidified (analogous to Ex. 2) | 75.4 | 569 | 1.33 |
| Humidified (analogous to Ex. 1) | 67.0 | 582 | 0.51 |

The low good product proportion without humidification is increased to the values of Example 4 after humidification but it does not achieve the strength values of the other experiments.

From the above experimental results, it will be seen that an amount of condensed phosphate in the spray solution, an amount of alkaline earth sulfate, the addition of boric acid or its salts and subsequent humidification treatment, significantly increases the strength values of the sodium tripolyphosphate spheres produced by the spray method in comparison to the sodium tripolyphosphate spheres obtained by normal operation.

EXAMPLE 11

An approximately 50% solution of mono- and disodium phosphate prepared from thermal phosphoric acid, having a ratio of Na:P of approximately 5:3 and having had added to it 13% sodium tripolyphosphate (calculated on the weight of the finished product) is spray dried under gentle conditions by the counter current process. A mixture of ortho and condensed phosphates is obtained. During processing, the added tripolyphosphate is partially degraded through hydrolysis down to the pyro stage. Also during drying a further pyrophosphate is formed as the result of the action of the temperature. The calcined phosphates, which in turn contain 31.5% pyrophosphate and 10.5% sodium tripolyphosphate. The calcined product is humidified at 40 to 50° C. with steam. The following values are obtained:

| Treatment | Good product proportion | Bulk density | Ash loss |
|---|---|---|---|
| Not humidified | 61.9 | 570 | 0.1 |
| Humidified | 79.4 | 576 | 1.79 |

EXAMPLE 12

If the solution described in Example 11 is processed, as a result of variation of the dwelling time in the spray tower and modification of the calcining conditions, into a product consisting of approximately 70% orthophosphate and 30% condensed phosphates, which in turn consist of 19% pyrophosphates and 11% sodium tripolyphosphate, and the calcinate is humidified in the manner described in Example 11, the following values are obtained:

| Treatment | Good product proportion | Bulk density | Ash loss |
|---|---|---|---|
| Not humidified | 73 | 582 | 0.1 |
| Humidified | 82 | 591 | 0.9 |

EXAMPLE 13

An approximately 50% sodium of mono- and disodium phosphate produced from thermal phosphoric acid, having a ratio of Na:P of approximately 5:3, is sprayed in counter current. 13% sodium tripolyphosphate (calculated on the weight of the finished product) and 0.017% boron in the form of borax are added to this solution. A mixture of 60% orthophosphate and 40% condensed phosphate is then obtained which, after chromatographic analysis, is found to consist of 33% pyrophosphate and 7% higher condensed phosphate. This product is conventionally calcined and then brought into continuous contact with a stream of moist air at 50° C.

| Treatment | Good product proportion | Bulk density | Ash loss |
|---|---|---|---|
| Not humidified | 69.9 | 579 | 0.1 |
| Humidified at 40-50° C | 84.2 | 580 | 0.9 |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process of increasing the hardness of sodium tripolyphosphate hollow spheres which comprises spray-drying a solution of mono- and disodium phosphate which has been adjusted to a ratio of Na:P of approximately 5:3 to yield a spray product which contains more than 10% by weight condensed phosphate in which said solution has (A) a soluble alkaline earth metal sulfate content of at least 0.04 to 0.6% by weight, calculated as $SO_3$, or (B) a boric acid or borax compound content of at least 0.004 to 0.04% by weight, calculated as boron, or a mixture of (A) and (B) in such an amount that the effect achieved is at least as large as that achieved by the minimum amount of (A) or (B) when used individually, said percentage by weight being related to the phosphate finally produced, calcining the spray product and treating the calcinate at a temperature of less than 80° C. with sufficient moisture to yield a product having an ash loss of 0.2 to 7% by weight.

2. The process of claim 1 wherein said solution contains an amount of alkaline earth metal sulfate that corresponds to 0.06 to 0.4% by weight $SO_3$.

3. The process of claim 1 wherein said solution contains an amount of boric acid or inorganic boric acid compound that corresponds to 0.005 to 0.04% by weight boron.

4. The process of claim 1 wherein said solution is converted into a spray product that contains more than 10% by weight of sodium tripolyphosphate.

5. The process of claim 1 wherein said solution is processed into a spray product that does not contain more than 40% by weight of sodium tripolyphosphate.

6. The process of claim 1 wherein the treatment with moisture is carried out at a temperature of 10 to 60° C.

7. Tripolyphosphate spheres produced by the process of claim 1.

References Cited

UNITED STATES PATENTS

| | | | |
|---|---|---|---|
| 3,650,685 | 3/1972 | Dyer et al. | 23—106 |
| 3,397,948 | 8/1968 | Mesmer | 23—106 |
| 3,384,452 | 5/1968 | Heymer et al. | 23—106 |
| 2,977,317 | 3/1961 | Rodis et al. | 23—106 X |
| 3,233,968 | 2/1966 | Koebner et al. | 23—106 |

FOREIGN PATENTS

| | | | |
|---|---|---|---|
| 214,259 | 8/1956 | Australia | 23—106 |

HERBERT B. GUYNN, Primary Examiner

U.S. Cl. X.R.

423—315